United States Patent [19]

Finkbeiner et al.

[11] 4,317,559

[45] Mar. 2, 1982

[54] MEMBRANE FOR A VALVE AND METHODS OF FABRICATING A MEMBRANE

[75] Inventors: Ludwig Finkbeiner, Walheim; Albano De Paoli, Mühlacker, both of Fed. Rep. of Germany

[73] Assignee: Robert Bosch GmbH, Stuttgart, Fed. Rep. of Germany

[21] Appl. No.: 53,565

[22] Filed: Jun. 29, 1979

[30] Foreign Application Priority Data

Jul. 27, 1978 [DE] Fed. Rep. of Germany ....... 2832932

[51] Int. Cl.[3] .................................... F16K 7/12

[52] U.S. Cl. .................................... 251/331; 251/368; 92/103 M; 430/324

[58] Field of Search ............. 251/368, 331; 92/103 M; 430/320, 324

[56] References Cited

U.S. PATENT DOCUMENTS

| | | | |
|---|---|---|---|
| 2,520,386 | 8/1950 | Dillman | 92/103 M |
| 2,765,230 | 10/1956 | Tinklenberg | 430/324 X |
| 3,430,613 | 3/1969 | Barnes | 251/368 X |
| 3,503,307 | 3/1970 | Migdal | 92/103 M |
| 3,791,340 | 2/1974 | Ferrara | 430/324 X |
| 3,832,176 | 8/1974 | Verstraete et al. | 430/324 X |
| 3,918,495 | 11/1975 | Abrahams | 251/368 X |
| 3,950,569 | 4/1976 | Morgan | 430/324 X |
| 4,107,351 | 8/1978 | Jameset al. | 430/324 X |
| 4,126,295 | 11/1978 | Natalizia | 251/368 X |
| 4,195,659 | 4/1980 | Barthelmes et al. | 123/139 AW |

*Primary Examiner*—Arnold Rosenthal
*Attorney, Agent, or Firm*—Edwin E. Greigg

[57] ABSTRACT

A membrane which serves as the movable valve member of a valve such as a distribution and apportionment valve of a fuel injection system for internal combustion engines, the membrane having at least one area intended for clamping purposes, at least one area of elasticity, and at least one control area, whereby the control area has a greater thickness than does the elastic area. The clamping area of the membrane may be provided with a photographic lacquer layer (negative lacquer) which serves as a sealing means and as protection against corrosion between the membrane and the valve housing. The invention further includes a method for fabricating the membrane onto which an adherent metallic layer is applied either by galvanic means or in a chemical bath.

5 Claims, 5 Drawing Figures

MEMBRANE FOR A VALVE AND METHODS OF FABRICATING A MEMBRANE

BACKGROUND OF THE INVENTION

The use of membranes has already been proposed for the control of a distribution and apportionment valve of a fuel injection system, where small plates are soldered onto the membrane in the region of the valve seat for the purpose of reinforcement. However, in addition to the high supplemental cost required for the manufacture of such a membrane, there was the disadvantage that the small plates worked loose and led to valve failure and that the membrane exhibited internal stresses. The manufacture of a membrane having varying valve thicknesses by photochemical means (etching) has also already been proposed.

There was furthermore the problem of sealing the membrane from the valve housing, for which purpose sealing paste was used, but some of this paste frequently found its way into the working chamber of the valve and this resulted in fouling the valves.

OBJECTS AND SUMMARY OF THE INVENTION

The membrane according to the invention fabricated from a single piece of sheet material has the advantage over the prior art that it attains a high level of operational reliability with simultaneous favorable spring properties.

It is especially advantageous to fabricate the membrane of this invention from a copper-beryllium alloy, since desirable physical properties such as hardness, surface quality and spring property are obtained and when the valve housing is fabricated of aluminum there are virtually identical heat expansion coefficients, so that the influencing of control properties of the membrane by temperature fluctuations is prevented.

It is further advantageous to provide the membrane within the clamping area with a photo-resist lacquer layer resistant to the medium flowing therethrough, particularly with a negative-working photopolymer lacquer layer, which serves as a sealing means and as protection from corrosion between the membrane and the valve housing. As a result of the clamping area, which is thicker than the springy area, a higher degree of rupturing strength is attained and thereby less failure and more cost-favorable manufacture.

The method according to the invention for fabrication of a membrane by galvanic application of an adherent metallic layer has the advantage that the membrane can be fabricated in a cost-favorable manner without being damaged by heat.

The employment of the negative-working photoresist lacquer layer as a sealing and anti-corrosive means offers the advantage of a cost-effective solution to the problem of sealing and of corrosion.

Advantageous further embodiments also result from the use of a copper-beryllium alloy for the membrane body and of nickel or chrome for the adherent metallic layer.

The method in accordance with the invention of producing the membrane in a reductive chemical bath also has the advantage that the membrane can be produced in a cost-favorable manner and without being damaged by heat.

The invention will be better understood as well as further objects and advantages thereof become more apparent from the ensuing detailed description of a preferred embodiment of the invention taken in conjunction with the drawing.

DESCRIPTION OF THE PREFERRED EMBODIMENT

Figure 1:
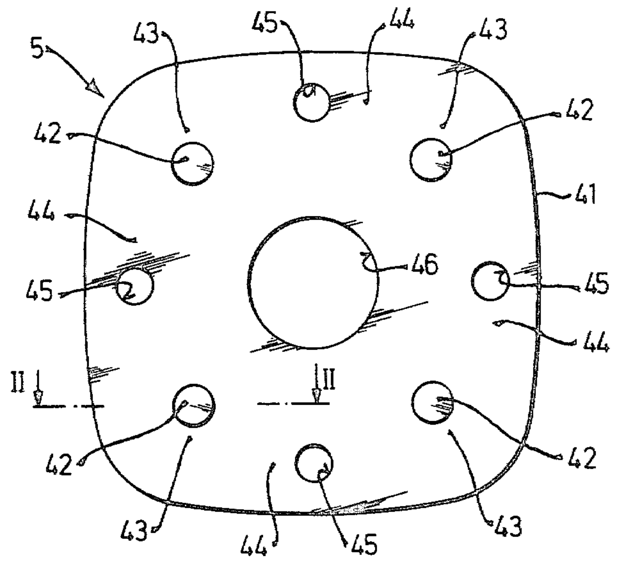
FIGS. 1, 1*a* and 2 show a membrane produced in accordance with the method of the invention.
Figure 1A:
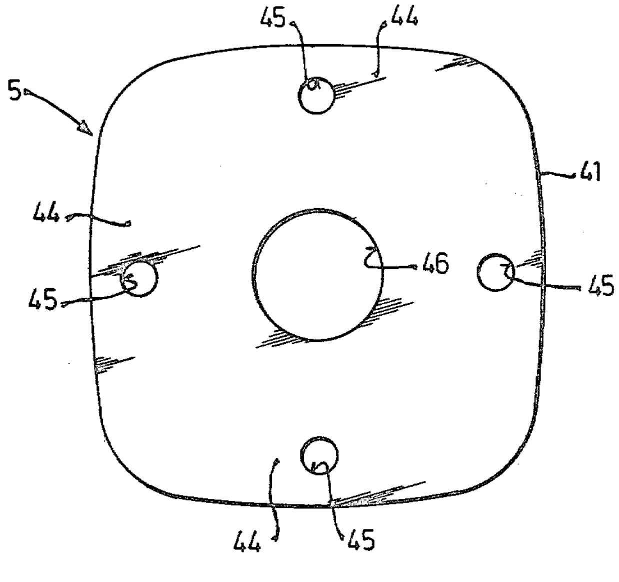
Figure 2:
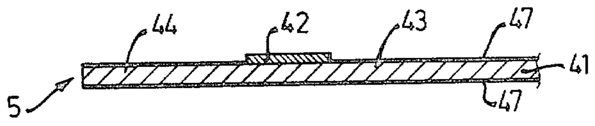

In FIGS. 1, 1*a* and 2, a membrane 5 is shown by way of example, which is fabricated in accordance with the methods described below. The membrane 5 can be thus embodied as a single membrane for the control of one membrane valve each, or as a multiple membrane as shown, for the simultaneous control of a plurality of membrane valves. In accordance with the invention, the membrane 5 includes a body having various profile or cross-sectional thicknesses. Thus, in FIG. 1, the membrane 5 has in front view a membrane body 41 having at least one elastic area 43 surrounding the control area 42 and at least one clamping area 44 surrounding the elastic area 43. Each control area 42 has a greater thickness than the elastic area 43. By this means, displacement of the control area 42, which cooperates with at least one valve seat of a valve, from the valve seat is avoided. Displacement of the control area from the valve seat causes valve failure particularly at high stress levels and at high temperatures. The area 43 simultaneously exhibits good spring properties and allows sufficient regulation in the membrane. The numerals 45 and 46 represent apertures in the membrane 5, which serve to fix the membrane in its installed position or to be attached to a valve housing, as well as to guide actuation elements through the membrane. In accordance with the invention the clamping area 44 of the membrane 5 is provided with a photo-resist lacquer layer 47 resistant to the medium which flows through the valve. Also, dependent upon the intended use of the membrane, this layer is provided on the front side and on the rear side of the membrane.

FIG. 1*a* shows the rear side of the diaphragm 5. Preferably, a negative-working photo-polymer lacquer having good adhesion to the membrane is used as the photoresist. The photo-resist lacquer layer 47 in the clamping area 44 of the membrane 5 serves, after installation, as a sealing and anti-corrosive layer between the membrane 5 and the clamping means.

The fabrication of a membrane shown by way of example in FIGS. 1, 1*a* and 2 is accomplished in accordance with the invention by means of the application of an adherent metallic layer onto a membrane body 41, which may be produced by stamping. This application may take place either by galvanic means or by precipitation from a reductive chemical bath. Both the galvanic separation and that of metal out of a reductive chemical bath without an external circuit of current are known technical procedures which therefore need not be explained in detail. Both methods have the advantage that the springy area and the control area can consist of different materials. In order to limit the application of the adherent metallic layer only to certain areas of the membrane body 41, the membrane body is provided on its front and rear side, in a known manner, with a negative photo-resist lacquer layer and exposed to light and fixed within a suitable device, such as a photographic transparency envelope, in such a manner that the desired structure is imparted onto the photo-resist lacquer layer. In the present example, the control area is accordingly not provided with a photo-resist layer. If this membrane body 41, thus prepared, is dipped into a galvanic bath, then an adherent metallic layer builds up on the uncovered control area 42. A copper-beryllium alloy serves advantageously as the membrane body 41 and hard nickel or hard chrome is applied in the control area 42 as the adherent metallic layer.

Figure 3:
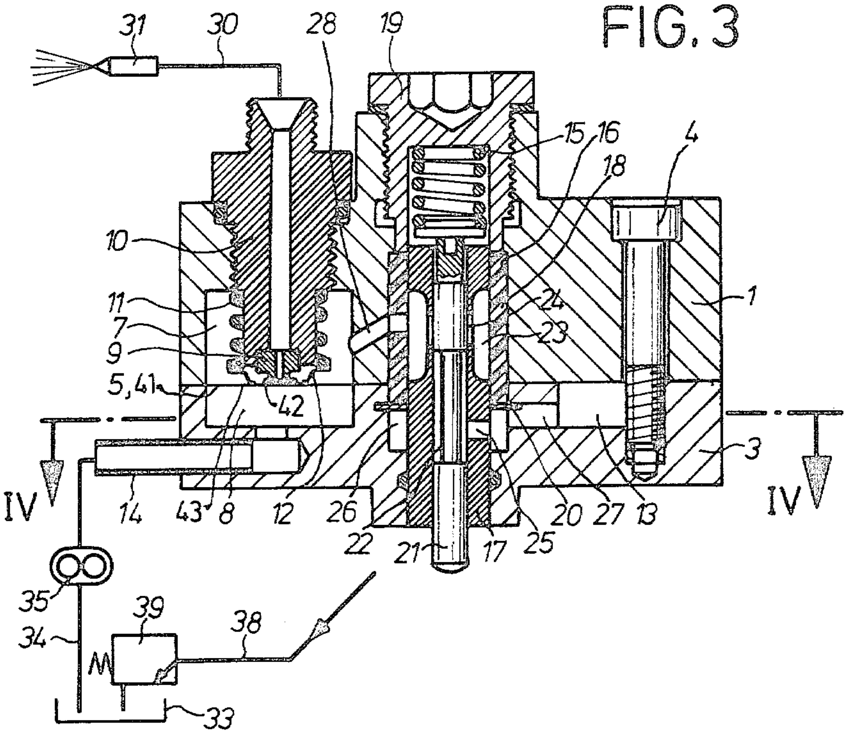
FIG. 3 is a longitudinal cross sectional view along the line III—III of FIG. 4 through a distribution and apportionment valve of a fuel injection system.
Figure 4:
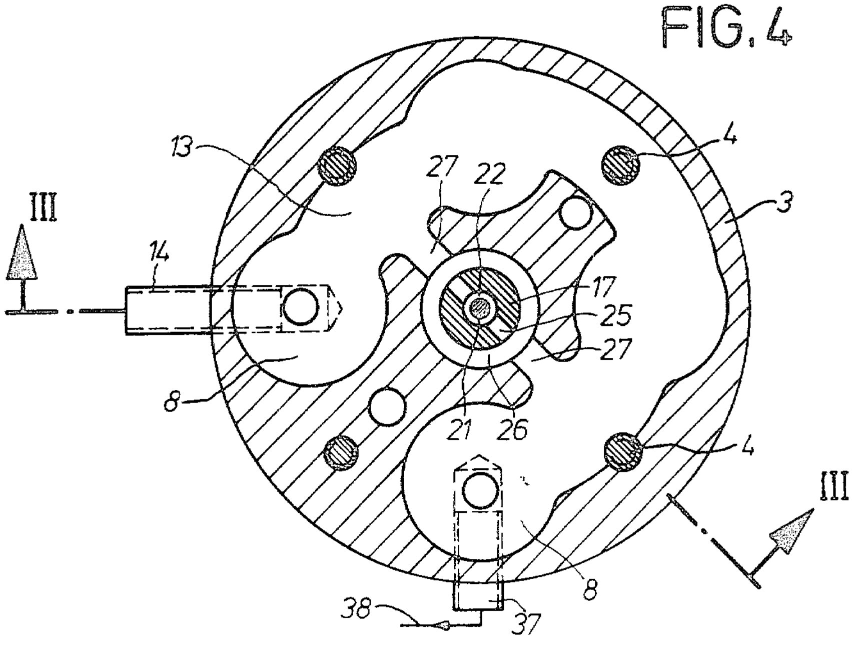
FIG. 4 is a cross section along the line IV—IV of FIG. 3.

For the functioning of the membrane 5 within a fuel distribution and apportionment valve corresponding to FIGS. 3 and 4, it is furthermore necessary that the photo-resist lacquer layer covering the control areas 42 and on the rear side of the membrane covering the springy areas 43 be removed. The photo-resist lacquer layer on the clamping area 44 remains on the membrane as a sealing and anticorrosion means.

In the further proposed method, the membrane body 41, provided as above with a fixed photo-resist layer, is dipped into a reductive chemical bath which separates out nickel or chrome, for example, so that an adherent metallic layer builds up on the membrane body 41 in the control area 42. Subsequently, the photo-resist layer, along with the metallic layer which has also built up on it, is removed.

The employment of the membrane 5 produced in accordance with the method of the invention will now be described with the aid of FIGS. 3 and 4. The valve shown here is a fuel quantity distribution and apportionment valve for internal combustion engines having an upper housing portion 1 and a lower housing portion 3, which are clamped together axially by means of screws 4. Between the upper housing portion 1 and the lower housing portion 3, there is clamped the metallic membrane 5 embodied in accordance with FIGS. 1 and 2, which serves, in the region of axial bores distributed equidistantly about the axis of the housing and dividing these bores into chambers 7 and 8, as the movable valve member of membrane valves. In the illustrated example, this is a fuel distribution and apportionment valve for a 4-cycle engine; thus, there are four membrane valves.

The stationary valve seat 9 disposed in the plane of the membrane clamping is part of a valve seat carrier 10 which is threadedly secured in or pressed into the upper housing portion 1 and, cooperating with the control region 42 of the membrane 5, serves as a connector for lines 30 which lead to the fuel injection valves 31, only one of each of which is shown. The carrier 10 is engaged by one end of a coil spring 11 which preferably has a spring characteristic of flat course. The other end of the coil spring 11 engages a spring plate 12 which, in turn, is in engagement with the membrane 5 and urges the same in the opening direction, so that the membrane valve is open when inoperative.

The chambers 8 located within the lower housing portion 3 are interconnected by an annular channel 13 running through them one after another in such a manner that the fluid flows through them in sequence. From a fuel tank 33 a line 34 leads through a continuously delivering fuel pump 35 to a connector 14 communicating with the first of the chambers 8. From the last chamber 8 in the direction of flow, a line 38 leads via a connector 37 to a pressure maintenance valve 39 and back to the fuel tank 33.

In an axial bore 16 extending through both housing portions 1 and 3, there is disposed a bearing sleeve 17 which is secured against axial or angular displacement by an elastic (e.g., rubber) packing sleeve 18 which is axially compressed by means of a plug 19, urging it against a disc 20 supported in the lower housing portion 3.

In the bearing sleeve 17 there is disposed a control plunger 21 which is axially displaceable therein against the force of a spring 15 and which is provided with an annular groove 22. Instead of the spring 15, pressure fluid may serve to generate the return force exerted on the control plunger 21, being controlled by a hydraulic control system (not shown). The bearing sleeve 17 is provided with longitudinal grooves 23 which communicate with the inner bore of the bearing sleeve 17 through precisely identical, axially parallel, longitudinal slots (control slots) 24. Depending upon the position of the control plunger 21, the annular groove 22 thereof thus uncovers a longer or shorter portion of the control slots 24. The bearing sleeve 17 is further provided with radial bores 25 which establish a continuous communication between the annular groove 22 and an annular channel 26 disposed within the lower housing portion 3. From this annular channel 26, channels 27 extend, in a substantially radial direction, to the annular channel 13, thus establishing communication between annular channel 26 and chambers 8 of the membrane control valves. The longitudinal grooves 23 of the bearing sleeve 17 each communicate with one chamber 7 via channels 28. Thus one longitudinal groove 23 with its control slot 24 is associated with each membrane control valve, and the chambers 7 of the membrane control valves are separated from one another.

The operation of the fuel distribution and apportionment valve is as follows:

The fuel proceeds from the fuel tank 33 through the line 34, the continuously delivering fuel pump 35 and the connector 14 to one of the chambers 8 of the membrane control valve and from there flows through the annular channel 13 to the other chambers 8 of the further membrane control valves. One part of the fuel returns to the fuel tank 33 through the connector 37, line 38 and the pressure maintenance valve 39, which determines the pressure in the system. The other part of the fuel flows to the annular channel 26 through channels 27 and from there via the radial bores 25 into the annular groove 22 of the control plunger 21. The annular groove 22 opens the control slots 24 to a greater or lesser extent; through them, the fuel can proceed, having been apportioned, into the longitudinal grooves 23 and from there via the channels 28 into the chambers 7 of the membrane control valves.

The stiffness of the membrane 5 and the force of the spring 11 are designed to be such that in case of a deviation from a predetermined pressure drop between the fuel pressures prevailing in the two chambers 7 and 8 of the membrane control valves, the flow passage section between the control area 42 of the membrane 5 and the valve seat 9 continuously changes until the predetermined pressure drop is again obtained. With this flat seat valve, this is attained in an extraordinarily short time, because even a small displacement of the membrane changes the flow passage section substantially. In the fuel quantity distribution and apportionment valve shown, the maximum opening displacement for the largest flow quantity is approximately 0.1 mm. Because of the small displacement of the membrane, the force of the spring 11 associated with each membrane control valve changes only slightly. Consequently, the control of the pressure drop can proceed in a very precise manner; that is, the pressure drop is substantially constant, independently of the flow rate of fuel.

The utilization of substances having identical or approximately identical heat expansion coefficients for the valve housing and the membrane prevents apportionment errors caused by temperature stresses. Preferably, the housing substance is aluminum and the membrane substance is a copper-beryllium alloy, which furthermore assures sufficient hardness, surface quality and spring properties. The copper-beryllium alloy used comprises approximately two parts by weight of beryllium and the rest is copper (for example, Berylco 25 HT CuBe2 made by Deutsche Beryllium GmbH).

The embodiment of the membrane 5 by the method described permits a high degree of operational reliability in the membrane valves. The reinforced embodiment of the control areas 42 prevents damage to the membrane by the valve seats as a result of pressure surges, while good regulatory properties are maintained as a result of the favorable spring properties of the area 43, which has a thinner cross-section. It is advantageous to leave the photo-resist lacquer layer, which is required for the fabrication of the membrane, in place on the front and rear sides of the membrane in the clamping area 44, since the photo-resist lacquer layer, which is chosen for resistance to fuel, for example, serves as a sealing layer and as an anticorrosion layer when the membrane 5 is clamped between the upper housing portion 1 and the lower housing portion 3.

The membrane produced in accordance with the methods described above is suitable not only as a valve membrane, as described, but may be used in many other ways as well, for instance as the movable member of a switching or actuating device, or as an electrical contact of an electrical switch.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A membrane for use as a movable valve member in combination with a valve seat of a valve which includes: at least one metallic area of uniform thickness adhered to said membrane to form at least one metallic control area of a combined thickness greater than that of said membrane; a flexible area of said membrane surrounding each of said control areas and a clamping area surrounding each of said flexible areas; said clamping areas of said membrane including a photographic lacquer layer thereon; said flexible area and said clamping area having a thickness less than that of said control area in combination with said membrane.

2. A membrane in accordance with claim 1, further wherein said clamping area and said flexible area of said membrane are provided with a photographic lacquer layer, comprising a photopolymer lacquer layer (negative lacquer), resistant to the medium flowing through said valve.

3. A membrane in accordance with claim 1, further wherein said membrane body comprises a copper-beryllium alloy.

4. A membrane in accordance with claim 1, further wherein said adherent metallic layer is composed at least of one of the metals consisting of nickel and chrome.

5. A membrane in accordance with claim 1, further wherein said adherent metallic layer comprises chrome.

* * * * *